(12) United States Patent
Helbing et al.

(10) Patent No.: US 7,668,716 B2
(45) Date of Patent: Feb. 23, 2010

(54) INCORPORATION OF EXTERNAL KNOWLEDGE IN MULTIMODAL DIALOG SYSTEMS

(75) Inventors: Marc Helbing, Aachen (DE); Klaus Reifenrath, Hueckelhoven (DE)

(73) Assignee: Dictaphone Corporation, Burlington, MA (US)

( * ) Notice: Subject to any disclaimer, the term of this patent is extended or adjusted under 35 U.S.C. 154(b) by 542 days.

(21) Appl. No.: 11/429,497

(22) Filed: May 5, 2006

(65) Prior Publication Data

US 2007/0038445 A1 Feb. 15, 2007

Related U.S. Application Data

(60) Provisional application No. 60/677,948, filed on May 5, 2005.

(51) Int. Cl.
*G10L 15/26* (2006.01)
*G10L 15/00* (2006.01)
*G10L 21/00* (2006.01)

(52) U.S. Cl. ............... 704/235; 704/236; 704/252; 704/270

(58) Field of Classification Search ............ None
See application file for complete search history.

(56) References Cited

U.S. PATENT DOCUMENTS

| 6,064,957 | A  | * | 5/2000 | Brandow et al. | 704/235 |
| 6,993,482 | B2 | * | 1/2006 | Ahlenius | 704/235 |
| 7,162,422 | B1 | * | 1/2007 | Bennett | 704/236 |
| 7,243,069 | B2 | * | 7/2007 | Jaepel et al. | 704/235 |
| 7,539,619 | B1 | * | 5/2009 | Seligman et al. | 704/277 |
| 2002/0087307 | A1 | * | 7/2002 | Lee et al. | 704/233 |

* cited by examiner

*Primary Examiner*—Matthew J Sked
(74) *Attorney, Agent, or Firm*—Wolf, Greenfield & Sacks, P.C.

(57) ABSTRACT

A device improves speech recognition accuracy by utilizing an external knowledge source. The device receives a speech recognition result from an automatic speech recognition (ASR) engine, the speech recognition result including a plurality of ordered interpretations, wherein each of the ordered interpretations includes a plurality of information items. The device analyzes and filters the plurality of interpretations using an external knowledge source to create a filtered plurality of ordered interpretations. The device stores the filtered plurality of ordered interpretations to a memory. The device transmits the filtered plurality of ordered interpretations to a dialog manager module to create a textual output. Alternatively, the dialog manager module retrieves the filtered plurality of ordered interpretations from a memory.

45 Claims, 3 Drawing Sheets

INCORPORATION OF EXTERNAL KNOWLEDGE IN MULTIMODAL DIALOG SYSTEMS

BACKGROUND OF THE INVENTION

1. Field of the Invention

In embodiments, there is disclosed the use of external knowledge in the process of updating dialog, text and/or visual session data storage from the current mode result (such as an automatic speech recognition result).

2. Background

Spoken computer-dialog systems in which a human caller is talking to a computer (e.g., through a telephone or other audio enabled device) are known. In such systems the computer is able to generate speech output, either as synthesized or prerecorded speech or a mixture of the two. The system may further feature an automatic speech recognition (ASR) engine, which analyses sound data digitized from a caller's utterances. The ASR engine generates a speech recognition result which contains an ordered list of alternative interpretations. Each interpretation consists of one or more information items. The speech recognition result is then passed to a dialog manager for further analysis, at the end of which the dialog manager generates a textual output suitable for speech output generation. Such automatic speech recognizers can produce inaccurate results, especially for utterances that are acoustically similar. Quite often external knowledge is available that could be used to favor or reject certain parts of the recognition result. The problem is how to consistently apply such knowledge, especially in combination with the information gathered in the history of a dialog.

SUMMARY OF THE INVENTION

The introduction of external knowledge into the process of updating the dialog, text and/or visual ("mode") session data storage from the current mode result (e.g., processing external knowledge sources before updating the dialog session data in automatic speech recognition) is used to produce more accurate results in a computer response-mode input system.

There is a variety of knowledge sources, such as the following:

(a) if a caller says a first and last name, a directory can be used to detect invalid combinations thereof;
(b) if the caller speaks a date, invalid combinations such as February 30th can be detected by using a calendar;
(c) if the caller's current position is known, the information can be used to assume that travel requests issued by the caller will have his current location as the origin with a high probability;
(d) if the caller says a city name, the country where this city lies can be deducted on many cases by using a geographical database; and
(e) if the caller can be identified, e.g. by the calling number and/or an authorization question, the caller's preferences can be use to weigh the recognition result.

DETAILED DESCRIPTION

In an embodiment disclosed herein, external knowledge is introduced into the process of updating the dialog session data storage from the current automatic speech recognition ("ASR") result (i.e., external knowledge sources are processed before the update actually occurs). Such is in contrast to many solutions that attempt to include external knowledge after the recognition result has been processed and digested by either a dialog managing component or the speech application itself.

Such embodiment recognizes that there may be disadvantages in using external knowledge after the update, such as: (a) in many systems when the ASR result is processed, information is lost; an example for such a loss occurs in systems that only use the first best result; and (b) the information is used for the correction of previous utterances, an operation that can hardly be reversed.

An advantage of using external knowledge in the process of updating the dialog session data storage from the current ASR result is the independence from the application state. Dealing with the incorporation of external knowledge within the application may lead to repetitions in the code for the different states of the application.

Figure 1:
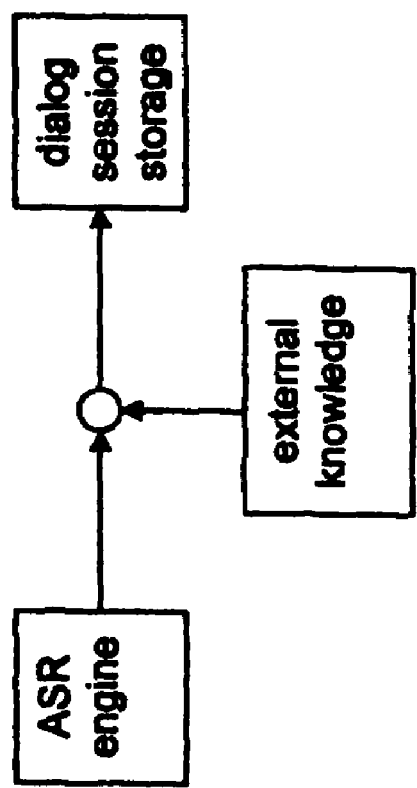
FIG. 1 shows a view of one embodiment system.
Figure 2:
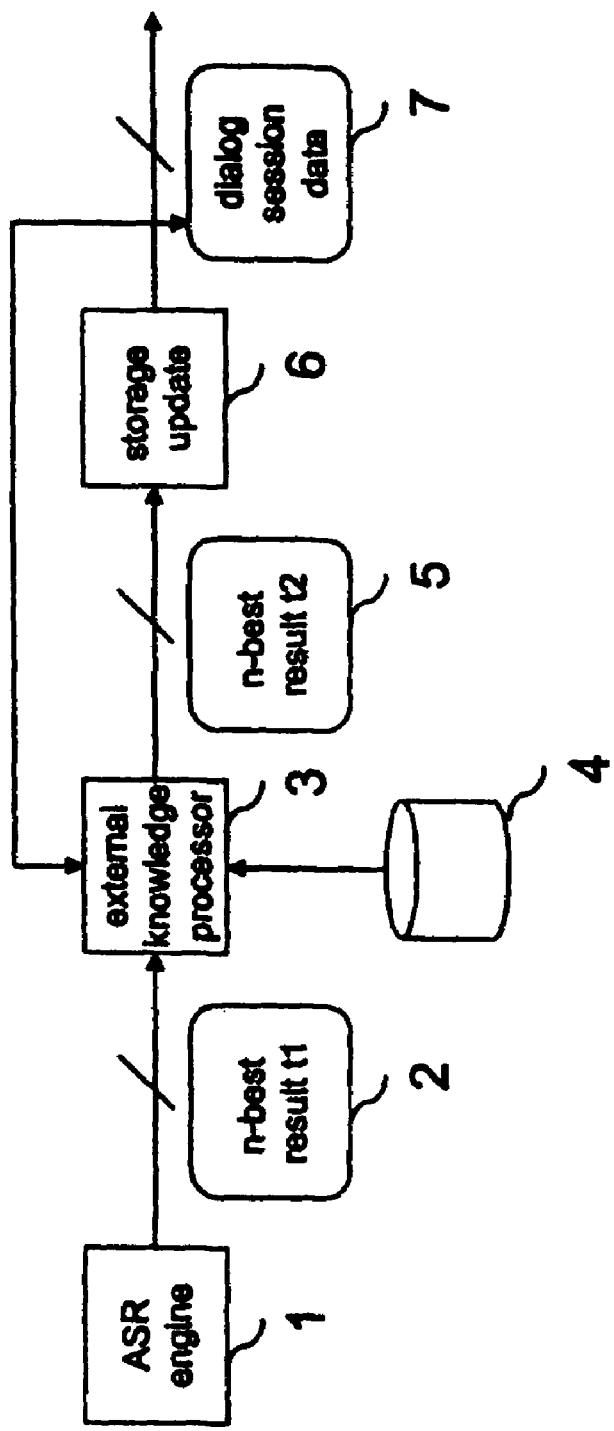
FIG. 2 shows a more detailed view of an embodiment system.

FIG. 2 shows a more detailed view of an embodiment system.

In the system illustrated in FIG. 2, an ASR engine 1 provides an initial speech recognition result 2, which contains an ordered list of alternative interpretations. Each interpretation consists of one or more information items. A component processing external knowledge 3 from a knowledge source 4 produces a second speech recognition result 5, which is potentially different from 2. This latter result is used by a storage update algorithm 6 to create a final representation of the result in the dialog session data store 7. This contains data from the current and from previous recognition results and optionally data inserted by 3 or the speech application. The external knowledge processor 3 acts like a filter on the result generated by the ASR engine 1.

In one invention, dialog history information from 7 is used during the processing of external knowledge in 3. In this way, information gathered in several utterances within one dialog can be used to restrict the current result to a useful combination with the help of the external knowledge source (e.g., for date retrieval, if the caller spoke the name of the month in one utterance (e.g., February) and the day of the month in another utterance (e.g., 30th), the knowledge processor 3 can still use the information of the previous utterance together with the current result to match against an external data source).

Figure 3:
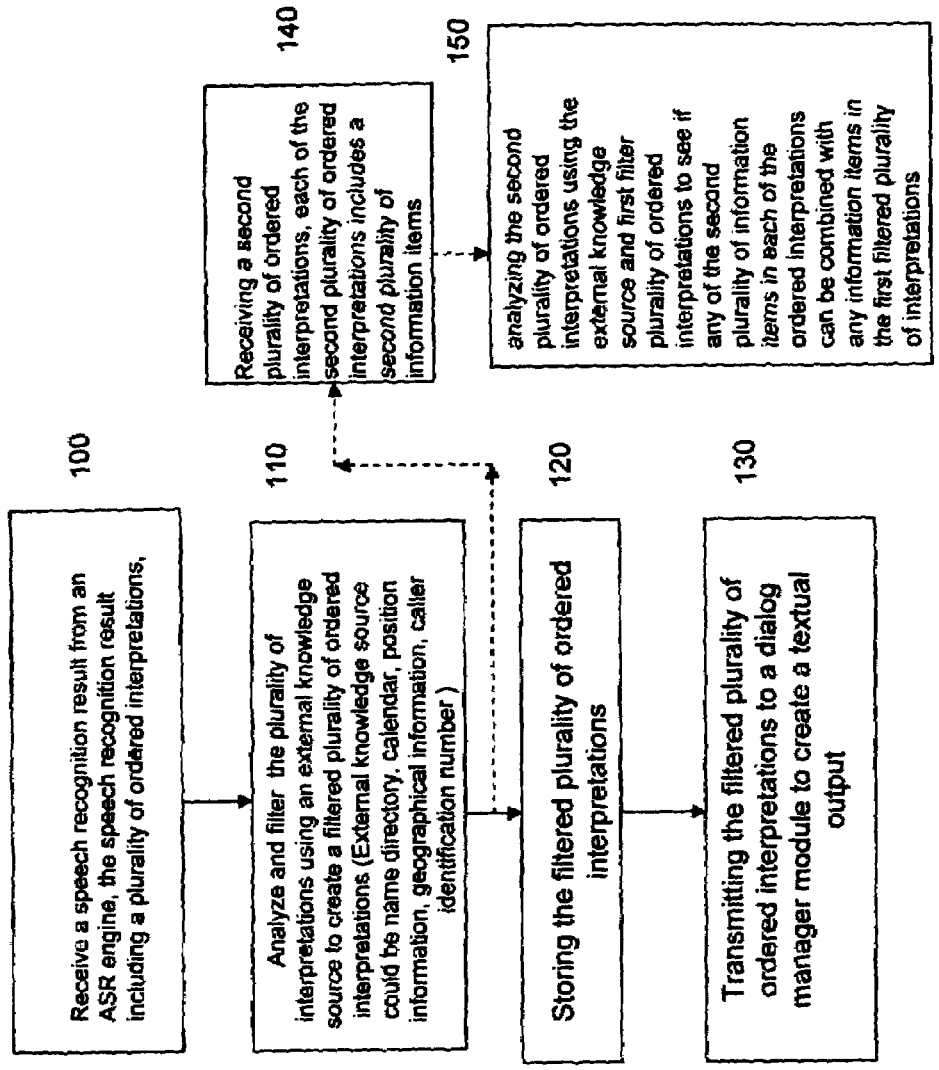
FIG. 3 is a flowchart illustrating a speech recognition method utilizing an external knowledge source for improved accuracy according to an embodiment of the present invention.

FIG. 3 is a flowchart illustrating a speech recognition method utilizing an external knowledge source for improved accuracy according to an embodiment of the present invention. An automatic speech recognition engine generates a speech recognition result. In an embodiment of the invention, the speech recognition result is received 100 by a device, e.g., a knowledge processor. The speech recognition result includes a plurality of ordered interpretations and each of the plurality of ordered interpretations includes a plurality of information items.

In an embodiment of the invention, the plurality of ordered interpretations are analyzed 110 and filtered using an external knowledge source to create a filtered plurality of ordered interpretations. In different embodiments of the invention, the external knowledge source may be a name directory or a calendar. In an embodiment of the invention, the external knowledge source may include position information or the external knowledge source may include geographical information. In an embodiment of the invention, the external knowledge source may include caller identification information.

Illustratively, the external knowledge source may be a directory with name data. During the analyzing and filtering of the plurality of interpretations, a device, e.g., an external knowledge processor, may compare an information item or a number of information items in the plurality of information items for each of the plurality of interpretations with the name data directory to determine if any invalid name combinations are present in the at least one information item. In an embodiment of the invention, after comparing the information items or the number of information items to the name directory, the device may modify the information item (or information items) with a valid name combination. In an embodiment of the invention, the device may deleted the information item(s) because the information item included an invalid name combination.

In another example, the external knowledge source may be a calendar with date information. During the analyzing and filtering of the plurality of ordered interpretations, a device may compare an information item(s) from the plurality of ordered interpretations with the calendar to detect if any invalid date combinations are present in the information item (s). In this embodiment of the invention, the information item(s) may be modified to include a valid date combination. Alternatively, the information item(s) may be deleted because they include an invalid date combination.

In another example, the external knowledge source includes position location information. During the analyzing and filtering of the plurality of interpretations, a device, e.g., an external knowledge processor, may determine if an information item(s) relates to travel request. If the information item(s) relate to a travel request, the device may add the position location information to the information item(s) relating to travel.

In another example, the external knowledge source includes a geographical database. During the analyzing and filtering of the plurality of ordered interpretations, a device, e.g., an external knowledge processor, a processor, or a software module, may identify information item(s) including a city name. If the device identifies that the external knowledge processor includes a city name, the device may add a corresponding state name from the geographical database to the identified information item(s). The device may increase a confidence score for each of the identified information item (s) relating to travel.

In another example, the external knowledge source may include a database having a caller identifier and corresponding preferences. The device, e.g., an external knowledge processor, a processor, or a software module, may determine that an incoming caller identifier has a match in the caller identifier database. If there is a match, the device retrieves a matching preference for the caller identifier from the database. The device generates confidence factors for the filtered plurality or ordered interpretations based on the retrieved matching preference.

After the filtered plurality of ordered interpretations are created, the device may store 120 the filtered plurality of ordered interpretations in a memory. After storing of the filtered plurality of ordered interpretations, in an embodiment of the invention, the device may transmit the filtered plurality of ordered interpretations to a dialog manager module to create a textual output. In an alternative embodiment of the invention, the dialog manager may retrieve the stored filtered plurality of ordered interpretations.

In an embodiment of the invention, the device, e.g., external knowledge processor, processor, or software module may act 140 on a second plurality of ordered interpretations where each of the second plurality of ordered interpretations includes a second information items. The device may analyze and filter 150 the second plurality of ordered interpretations using the external knowledge source and also the first filtered plurality of ordered interpretations. The device may utilize the first filtered plurality of ordered interpretations to see if any of the second information items can be combined with any information items in the first filtered plurality of interpretations. If any of the second information items can be combined with the first information items, they are combined and stored in an appropriate filtered ordered interpretation.

The present invention described above references flowchart illustrations of methods, apparatus, and computer program products. It will be understood that each block of the flowchart illustrations, and combinations of blocks in the flowchart illustrations, can be implemented by computer program instructions (as can any menu screens described in the Figures). These computer program instructions may be loaded onto a computer or other programmable data processing apparatus to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

The invention claimed is:

1. A computer implemented method of improving speech recognition, comprising:
    receiving a speech recognition result from an automatic speech recognition (ASR) engine, the speech recognition result including a plurality of ordered interpretations, wherein each of the ordered interpretations includes a plurality of information items; and
    analyzing, via at least one processor, the plurality of interpretations using an external knowledge source to create a filtered plurality of ordered interpretations;
    wherein the external knowledge source includes a position location information, and during the analyzing of the plurality of interpretations, the at least one processor determines if any of the plurality of information items relate to travel requests, and if so, adds the position location information to each information item of the plurality of information items relating to travel.

2. The method of claim 1, further including storing the filtered plurality of ordered interpretations.

3. The method of claim 1, further including transmitting the filtered plurality of ordered interpretations to a dialog manager module to create a textual output.

4. The method of claim 1, wherein the external knowledge source includes a directory with name data and during the analyzing of the plurality of interpretations, the at least one processor compares at least one information item in the plurality of information items from each of the plurality of interpretations with the name data directory to determine if any invalid name combinations are present in the at least one information item.

5. The method of claim 4, further including modifying the at least one information item with a valid name combination.

6. The method of claim 4, further including deleting the at least one information item because the at least one informational item was an invalid name combination.

7. The method of claim 1, wherein the external knowledge source includes a calendar with date information and during the analyzing of the plurality of interpretations, and wherein the method further comprises the at least one processor comparing at least one information item in the plurality of information items for each of the plurality of interpretations with the calendar to detect if any invalid date combinations are present in the at least one information item.

8. The method of claim 7, further including modifying the at least one information item with a valid date combination or deleting the at least one information item with an invalid date combination.

9. The method of claim 1, further comprising the at least one processor further increasing a confidence score for each of the plurality of information items relating to travel.

10. The method of claim 1, wherein the external knowledge source includes a geographical database, and during the analyzing of the plurality of interpretations, if the at least one processor identifies that at least one information item in the plurality of information items is a city name, the at least one processor adds a corresponding state name from the geographical database to the identified information item.

11. The method of claim 1, wherein the external knowledge source includes a database having a caller identifier and corresponding preferences and wherein the method further comprises, when the at least one processor determines that an incoming caller identifier has a match in the caller identifier database, then the at least one processor retrieves a matching preference for the caller identifier from the database.

12. The method of claim 11, wherein the at least one processor generates confidence factors for the plurality of filtered ordered interpretations based on the retrieved matching preference.

13. A computer implemented method of improving speech recognition, comprising:
receiving a speech recognition result from an automatic speech recognition (ASR) engine, the speech recognition result including a first plurality of ordered interpretations, wherein each of the first plurality of ordered interpretations includes a first plurality of information items;
analyzing, via at least one processor, the first plurality of interpretations using an external knowledge source to create a first filtered plurality of ordered interpretations;
receiving a second plurality of ordered interpretations, wherein each of the second plurality of ordered interpretations includes a second plurality of information items;
analyzing the second plurality of ordered interpretations using the external knowledge source and first filtered plurality of ordered interpretations to see if any of the second plurality of information items in each of the ordered interpretations can be combined with any information items in the first filtered plurality of interpretations; and
creating a second filtered plurality of ordered interpretations.

14. The method of claim 13, further including storing the second filtered plurality of ordered interpretations.

15. The method of claim 13, further including transmitting the second filtered plurality of ordered interpretations to a dialog manager module to create a textual output.

16. At least one computer readable memory encoded with a plurality of instructions that, when executed, perform a method of improving speech recognition, the method comprising:
receiving a speech recognition result from an automatic speech recognition (ASR) engine, the speech recognition result including a plurality of ordered interpretations, wherein each of the ordered interpretations includes a plurality of information items; and
analyzing the plurality of interpretations using an external knowledge source to create a filtered plurality of ordered interpretations;
wherein the external knowledge source includes a position location information, and during the analyzing of the plurality of interpretations, the at least one processor determines if any of the plurality of information items relate to travel requests, and if so, adds the position location information to each information item of the plurality of information items relating to travel.

17. The at least one computer readable memory of claim 16, further including storing the filtered plurality of ordered interpretations.

18. The at least one computer readable memory of claim 16, further including transmitting the filtered plurality of ordered interpretations to a dialog manager module to create a textual output.

19. The at least one computer readable memory of claim 16, wherein the external knowledge source includes a directory with name data and during the analyzing of the plurality of interpretations, and wherein the method further comprises the at least one processor comparing at least one information item in the plurality of information items from each of the plurality of interpretations with the name data directory to determine if any invalid name combinations are present in the at least one information item.

20. The at least one computer readable memory of claim 19, further including modifying the at least one information item with a valid name combination.

21. The at least one computer readable memory of claim 19, further including deleting the at least one information item because the at least one informational item was an invalid name combination.

22. The at least one computer readable memory of claim 16, wherein the external knowledge source includes a calendar with date information and during the analyzing of the plurality of interpretations, and wherein the method further comprises the at least one processor comparing at least one information item in the plurality of information items for each of the plurality of interpretations with the calendar to detect if any invalid date combinations are present in the at least one information item.

23. The at least one computer readable memory of claim 22, further including modifying the at least one information hem with a valid date combination or deleting the at least one information item with an invalid date combination.

24. The at least one computer readable memory of claim 16, further comprising the at least one processor further increasing a confidence score for each of the plurality of information items relating to travel.

25. The at least one computer readable memory of claim 16, wherein the external knowledge source includes a geographical database, and during the analyzing of the plurality of interpretations, if the at least one processor identifies that at least one information item in the plurality of information items is a city name, the at least one processor adds a corresponding state name from the geographical database to the identified information item.

26. The at least one computer readable memory of claim 16, wherein the external knowledge source includes a database having a caller identifier and corresponding preferences and wherein the method further comprises, if the at least one processor determines that an incoming caller identifier has a match in the caller identifier database, then the at least one processor retrieves a matching preference for the caller identifier from the database.

27. The at least one computer readable memory of claim 26, further comprising the at least one processor generating confidence factors for the plurality of filtered ordered interpretations based on the retrieved matching preference.

28. At least one computer readable memory encoded with a plurality of instructions that, when executed, perform a method of improving speech recognition, the method comprising:
receiving a speech recognition result from an automatic speech recognition (ASR) engine, the speech recognition result including a first plurality of ordered interpretations, wherein each of the first plurality of ordered interpretations includes a first plurality of information items;
analyzing the first plurality of interpretations using an external knowledge source to create a first filtered plurality of ordered interpretations;
receiving a second plurality of ordered interpretations, wherein each of the second plurality of ordered interpretations includes a second plurality of information items;
analyzing the second plurality of ordered interpretations using the external knowledge source and first filtered plurality of ordered interpretations to see if any of the second plurality of information items in each of the ordered interpretations can be combined with any information items in the first filtered plurality of interpretations; and
creating a second filtered plurality of ordered interpretations.

29. The at least one computer readable memory of claim 28, further including storing the second filtered plurality of ordered interpretations.

30. The at least one computer readable memory of claim 28, further including transmitting the second filtered plurality of ordered interpretations to a dialog manager module to create a textual output.

31. A system comprising:
at least one processor programmed to:
receive a speech recognition result from an automatic speech recognition (ASR) engine, the speech recognition result including a plurality of ordered interpretations, wherein each of the ordered interpretations includes a plurality of information items; and
analyze the plurality of interpretations using an external knowledge source to create a filtered plurality of ordered interpretations;
wherein the external knowledge source includes a position location information, and wherein the at least one processor is further programmed to, during the analyzing of the plurality of interpretations, determine if any of the plurality of information items relate to travel requests, and if so, add the position location information to each information item of the plurality of information items relating to travel.

32. The system of claim 31, wherein the at least one processor is further programmed to store the filtered plurality of ordered interpretations.

33. The system of claim 31, wherein the at least one processor is further programmed to transmit the filtered plurality of ordered interpretations to a dialog manager module to create a textual output.

34. The system of claim 31, wherein the external knowledge source includes a directory with name data and wherein the at least one processor is further programmed to, during the analyzing of the plurality of interpretations, compare at least one information item in the plurality of information items from each of the plurality of interpretations with the name data directory to determine if any invalid name combinations axe present in the at least one information item.

35. The system of claim 34, wherein the at least one processor is further programmed to modify the at least one information item with a valid name combination.

36. The system of claim 34, wherein the at least one processor is further programmed to delete the at least one information item because the at least one informational item was an invalid name combination.

37. The system of claim 31, wherein the external knowledge source includes a calendar with date information and wherein the at least one processor is further programmed to, during the analyzing of the plurality of interpretations, compare at least one information item in the plurality of information items for each of the plurality of interpretations with the calendar to detect if any invalid date combinations are present in the at least one information item.

38. The system of claim 37, wherein the at least one processor is further programmed to modify the at least one information item with a valid date combination or delete the at least one information item with an invalid date combination.

39. The system of claim 31, wherein the at least one processor is further programmed to increase a confidence score for each of the plurality of information items relating to travel.

40. The system of claim 31, wherein the external knowledge source includes a geographical database, and wherein the at least one processor is further programmed to, during the analyzing of the plurality of interpretations, if the at least one processor identifies at least one information item in the plurality of information items as a city name, add a corresponding state name from the geographical database to the identified information item.

41. The system of claim 31, wherein the external knowledge source includes a database having a caller identifier and corresponding preferences, and wherein the at least one processor is further programmed to determine that an incoming caller identifier has a match in the caller identifier database and retrieve a matching preference for the caller identifier from the database.

42. The system of claim 41, wherein the at least one processor is further programmed to generate confidence factors for the plurality of filtered ordered interpretations based on the retrieved matching preference.

43. A system comprising:
at least one processor programmed to:
receive a speech recognition result from an automatic speech recognition (ASR) engine, the speech recognition result including a first plurality of ordered interpretations, wherein each of the first plurality of ordered interpretations includes a first plurality of information items;
analyze the first plurality of interpretations using an external knowledge source to create a first filtered plurality of ordered interpretations;
receive a second plurality of ordered interpretations, wherein each of the second plurality of ordered interpretations includes a second plurality of information items;
analyze the second plurality of ordered interpretations using the external knowledge source and first filtered plurality of ordered interpretations to see if any of the second plurality of information items in each of the ordered interpretations can be combined with any information items in the first filtered plurality of interpretations; and
create a second filtered plurality of ordered interpretations.

44. The system of claim 43, wherein the at least one processor is further programmed to store the second filtered plurality of ordered interpretations.

45. The system of claim 43, wherein the at least one processor is further programmed to transmit the second filtered plurality of ordered interpretations to a dialog manager module to create a textual output.

* * * * *